United States Patent [19]

Yuki

[11] Patent Number: 4,499,196

[45] Date of Patent: Feb. 12, 1985

[54] ADSORBING DEACIDIFIER FOR OILY SUBSTANCES

[76] Inventor: Etsuji Yuki, 1454 Yano-cho, Akiku, Hiroshima-shi, Hiroshima-pref, Japan

[21] Appl. No.: 482,778

[22] Filed: Apr. 7, 1983

[30] Foreign Application Priority Data

May 4, 1982 [JP] Japan .................................. 57-74987

[51] Int. Cl.$^3$ ........................ B01J 29/06; B01J 20/14
[52] U.S. Cl. ........................................ 502/64; 502/60; 426/417
[58] Field of Search ....................... 502/64, 60; 426/417

[56] References Cited

U.S. PATENT DOCUMENTS 3,894,109 7/1975 Rosback ........................... 208/310 Z
3,929,669 12/1975 Rosback et al. ................. 423/328 X
3,954,819 5/1976 Husch ............................... 426/417 X

FOREIGN PATENT DOCUMENTS 743977 10/1966 Canada ................................ 426/417

*Primary Examiner*—Carl F. Dees
*Attorney, Agent, or Firm*—Moonray Kojima

[57] ABSTRACT

An adsorbing diacidifier for oily substances in a powder form, wherein the adsorbing diacidifier comprising dehydrated natural or synthetic zeolites and an aqueous solution of sodium hydroxide or potassium hydroxide adsorbed into said natural and synthetic zeolite for fixation, and in the adsorbing deacidifier, the ratio of water is from 10 to 40 weight percent. The adsorbing diacidifier is capable of effecting diacidification of oily substances through simple procedure by adding the diacidifier to an oily substances, with subsequent filtering after stirring for mixing. Another adsorbing diacidifier for oily substances, wherein adsorbing diacidifier comprising natural or synthetic zeolites and an aqueous solution of sodium hydroxide or potassium hydroxide adsorbed into said natural or synthetic zeolites for fixation and in the material thus prepared, the ratio of water is from 10 to 40 weight percent, and adding distomaceous earth at any desired ratio.

3 Claims, 1 Drawing Figure

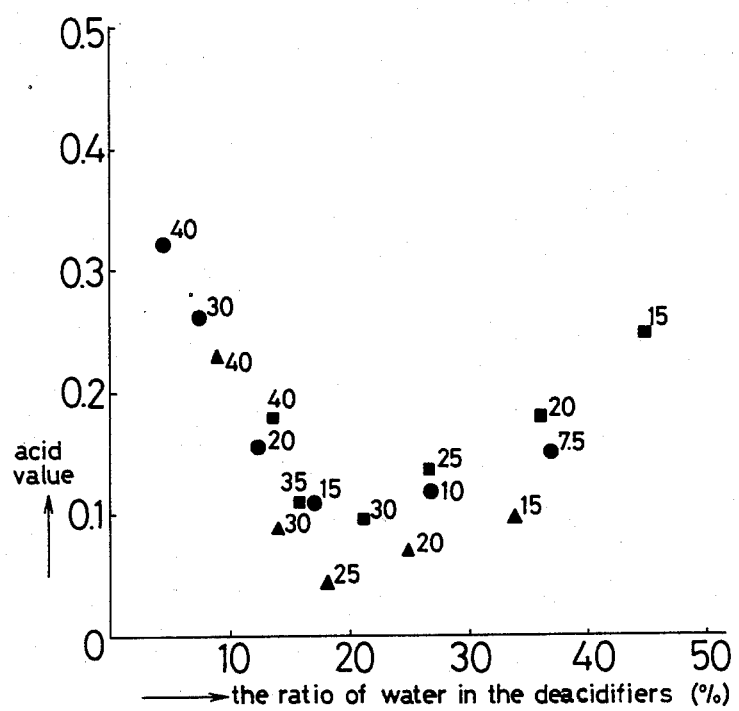

ADSORBING DEACIDIFIER FOR OILY SUBSTANCES

BACKGROUND OF THE INVENTION

Field of the Invention

The present invention relates to an adsorbing deacidifier or deacidifying agent for oily substances, and has for its object to provide a deacidifier in a powder form, which is capable of effecting deacidification of oily substances through simple procedures by adding the deacidifier to an oily substance, with subsequent filtering after stirring for mixing.

The oily substances referred to in the present invention indicate animal and vegetable fats, mineral oils, solvents, etc., and are used to correspond to the water soluble substances.

In cases where fried foods such as fried noodles, potato chips, dough-nuts, and fried beans, etc. are to be manufactured, since frying oil is repeatedly used in a frying pan, it tends to change in quality through the thermal oxidation, hydrolysis or the like thus resulting in a rise of acid value (referred to as AV hereinbelow) together with deteriorations such as coloring, increase of viscosity, etc. Recently, qualities of frying oils have been brought into question from the viewpoint of nutrition, with the qualities thereof being generally evaluated by AV. With respect to the fried noodles, AV of oils contained therein is prescribed to be less than 3.0 by the Food Sanitation Act in Japan. The main substances for the acid component which increases AV as described above are considered to be carboxyl group to be produced by thermal oxidation and free fatty acid to be produced by hydrolysis, and such acid components also have the so-called autocatalysis function for again assisting in the hydrolysis of the oils. Accordingly, if it is possible to remove the very small amount of acid component initially produced in the frying oil at all times, hydrolysis of the frying oil will be suppressed to a remarkable extent, with the increase of AV being advantageously prevented. At present, for the purpose of removing fine particles produced from materials to be fried, filtering of the frying oil after completion of frying work through employment of diatomaceous earth, etc. as a filter aid, has been widely effected, but by using the adsorbing deacidifier according to the present invention instead of the filter aid, the acid component is also removed together with the fine pariticles, and thus, the frying oil may be maintained at a low AV.

It should be noted here that the adsorbing deacidifier according to the present invention is not limited, in its application, merely to frying oils alone, but may effectively utilized for the purpose of regeneration of cutting oils, cleaning solvents, etc.

For deacidifiers for oily substances, there have conventionally been known such substances as magnesium oxide (U.S. Pat. No. 3,231,390), aluminum hydroxide gel (Japanese Patent Publication Tokugansho No. 47-50245), etc., but these known materials have such disadvantages that in the former, magnesium soap to be produced dissolves into oil, while in the latter, adsorbing capacity for acid component is undesirably small, thus not being favorable from the economic point of view.

Zeolite means a "boiling stone" in Greek, and mineralogically belongs to the group of zeolite. Today, not only natural zeolite, but many synthetic products thereof are being produced. Originally, zeolite is an aluminosilicate of alkali and alkaline earth metal, and contains water as a main component in the crystal lattice. The water of crystallization referred to above may be considerably easily eliminated partly or on the whole, through heating or pressure reduction, but substantially, destruction of crystal structure does not take place. It may be said that the structural feature of zeolite resides in the formation of hollow structure by a variety of combination systems of the structural unit. Such hollow structure has a property for easy recondensation, and even in this case, there are no structural change after adsorption or swell characteristics, without destruction by water, either. Meanwhile, as compared with other moisture absorbing agents such as silica gel, active alumina, etc., zeolite has such characteristics that it has a large moisture absorbing capacity even at a low humidity, with a high moisture absorbing strength. It is another feature of zeolite that it has a large moisture absorbing capacity, with a high moisture absorbing strength even at comparatively high temperatures. Additionally, although zeolite has a property to selectively adsorb polar substances through action of cation in the hollow structure, it has no properties to adsorb acid components in oily substances.

SUMMARY OF THE INVENTION

Zeolite according to the present invention has the hollow structure which has been made up of dehydration partially or almost completely in naturally or artificially. The adsorbing deacidifier as a first and second phases of the present invention is characterized in the utilization of the moisture adsorbing characteristics and the properties thereof strong against alkaline substances of zeolite. More specifically, when an aqueous solution of sodium hydroxide (abbreviated as NaOH hereinbelow) or of potassium hydroxide (abbreviated as KOH hereinbelow) is mixed with natural or synthetic zeolite, such aqueous solution is adsorbed into the hollow structure of zeolite for fixation, through the strong moisture absorbing property of zeolite when the material in such a state is added to an oily substance for stirring and mixing, the acid component in the oily substance is readily adsorbed onto the surface thereof and deacidification is to be effected through filtering of the resultant material.

In the mechanism of deacidification for the adsorbing deacidifier according to the present invention, the action of water adsorbed into the hollow structure of zeolite so as to be fixed, and having NaOH or KOH dissolved therein, plays the most important part. In the above water, NaOH, for example, is dissociated into ions of Na+ and OH−. In the oily substances, although the representative acid component is considered to be of long chain fatty acid (HCOOH) since its carboxyl group (COOH) is hydrophilic, it is adsorbed onto the surface of water adsorbed and fixed in the hollow structure of zeolite, and on the surface thereof, fatty acid sodium soap and water are produced with respect to NaOH dissolved in water for dissociation, as represented by the following formula.

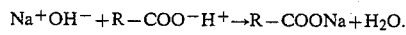

$$Na^+OH^- + R-COO^-H^+ \rightarrow R-COONa + H_2O.$$

These products are dissolved, as they are, into water adsorbed and fixed in the hollow structure of zeolite so as to be taken thereinto for consequently being removed from the oily substances.

In the deacidification effect of the adsorbing deacidifier according to the present invention also, the ratio of water in the deacidifier becomes an important factor. The poor diameter in the hollow structure of zeolite is extremely small in the order of 4 to 10 angstrom (A) or thereabout. Since the acid components in the oily substances are generally of higher molecular weight compounds, there are many cases where they can not enter the hollow structure of zeolite. In the case where the ratio of water is small in the deacidifier, with water completely taken into the hollow structure of zeolite, contact between NaOH dissolved therein for dissociation and the acid component becomes insufficient, with a consequent reduction of the deacidifying effect. Meanwhile, lowering of the deacidifying effect also takes place in the case where the ratio of water in the deacidifier is extremely large. If water is present in an amount more than the moisutre absorbing capacity of zeolite, the water will be adsorbed also into gaps between the particles of zeolite, thus giving rise to adhesion among the particles so as to deteriorate dispersion of the deacidifier during deacidifying operation, with the result that contact between the acid component and NaOH is undesirably obstructed. Moreover, it may be expected that water adsorbed into the gaps among the particles of zeolite is weak in its adsorbing strength as compared with water adsorbed and fixed in the hollow structure of zeolite, and tends to be dissociated from the deacidifier during deacidifying operation. In such a case, alkaline component is to remain in the oily substance.

BRIEF DESCRIPTION OF THE DRAWING

The drawing shows a relation between the ratios of water in the adsorbing deacidifier according to the present invention and the deacidifying effect thereof.

More specifically, NaOH aqueous solutions at various concentrations were added to synthetic zeolite A-4 (in powder form, 200 meshes, made by Tokyo Soda Kogyo Kabushiki Kaisha) for sufficient mixing so as to prepare deacidifier respectively containing NaOH at 3%, 6% and 9%. Synthetic zeolite used in this case indicated zero(0) of a loss in quantity by heating at the temperature of 150 degree C., 5 hours. In the drawing, the mark indicates NaOH at 3%, and the mark denotes NaOH at 6%, while the mark represents NaOH at 9%. Numerals in the drawing show concentrations (%) of sodium hydroxide aqueous solutions. The deacidifiers thus prepared were added to refined soy bean oil adjusted to AV 0.48 through addition of mixed fatty acid from soy bean oil, so that NaOH respectively contained exactly become the neutralization equivalent amounts, and the resultant mixtures were subjected to stirring and mixing for 10 minutes at temperatures of 50 to 70 degree C., with subsequent suction filtering by Toyo filter paper NO. 2. In the drawing, AV of the deacidified oils are plotted with respect to the ratios of water in the deacidifier.

As is shown here, the deacidifying effect is lowered in the case where the ratios of water in the deacidifier are less than 10%. Similarly, in the case where the ratios of water exceed 40% also, reduction of the deacidifying effect is noticeable.

However, as is also shown in the drawing, the most effective ratios of water are considered to be present in the range between 15 and 25%. (It is assumed that the ratios of water as described above may differ to a certain extent, according to the kinds of zeolite employed also.)

Although ratios of NaOH in the deacidifier and concentrations of NaOH aqueous solution have influences on the deacidifying effect, such influences are small as compared with those by the ratios of water. However, in order to increase the adsorbing capacity of deacidifiers from the economical point of view, there naturally exist proper ratios of NaOH and concentrations of NaOH aqueous solutions.

Zeolite has a large moisture absorbing capacity under a comparitively low vapor pressure, and the moisture adsorbing amounts thereof, for example, under a vapor pressure of 30 mmHg at room temperature are approximately in the range of 10 to 30%, although they may be different according to kinds of zeolites. Meanwhile, the rates of gaps in the hollow structure as measured on the basis of amounts of water of crystallization for sufficiently hydrated zeolite, are in the region of 20 to 50%. Based on these data and results of the experiments as described previously, the effective ratios of water in the deacidifier according to the present invention are considered to be in the range of 10 to 40%.

If the adsorbing deacidifier according to the present invention is prepared at proper ratios of water component and NaOH or KOH, deacidification may be readily effected through mere stirring and mixing with oily substances for subsequent filtering. In the above case, there is no possibility that NaOH or KOH remains in the deacidified oil to present alkalinity. This may be readily ensured by washing the deacidified oil by water for measuring its PH value. The reason for the above is considered to be attributable to the strong moisture absorbing characteristics of zeolite.

It should be noted here that the description related to "zeolite" in the present specification is based on the following literatures as references. "Characteistics and utilization of zeolite" by Kazuo TORII (Chief research scientist, Tohoku Industrial Technique Research Laboratory, Agency of Industrial Science and Technology) from the special lecture, Fusen 25, 184–191 (1978) at the 61st regular meeting of Fusen Association on Nov. 7, 1978. "Zeolite-fundamentals and applications" by N. HARA and K. TAKAHASHI, published by Kodansha, Apr. 20, 1978.

The adsorbing deacidifier according to the second phase of the present invention is one prepared by mixing diatomaceous earth to adsorbing deacidifier (first phase of the invention) at any desired ratio for the purpose of improving the deacidifying effect of said absorbing deacidifier (first phase of the invention) which is prepared by causing the aqueous solution of sodium hydroxide (referred to as NaOH hereinbelow) or potassium hydroxide (referred to as KOH hereinbelow), to be adsorbed and fixed in natural and synthetic zeolite.

The diatomaceous earth is produced through spontaneous setting of remains of diatoms which are one kind of water plants growing thick in a large amount on the earth during the prehistoric ages, onto ocean floors for millions of years, and has been employed extensively as a filter aid of various solutions, since it is extremely porous. However, as compared with the strong moisture adsorbing property of zeolite, the diatomaceous earth is hardly provided with the moisture adsorbing property. Accordingly, in the second phase of the present invention, it is intended to improve the deacidifying effect of the adsorbing deacidifier through utilization of properties of diatomaceous earth as described above.

In the first place, the adsorbing deacidifier (first phase of the invention) is prepared by causing the aqueous solution of NaOH or KOH to be adsorbed and fixed in natural and synthetic zeolites. With respect to the resultant material thus prepared, deatomaceous earth at any desired ratio was added for sufficient mixing, and thus, the adsorbing deacidifier of the second phase of the present invention was prepared. In the above case, since the diatomaceous earth has a weak moisture absorbing property, it plays a part for preventing the particles of the deacidifier (first phase of the invention) from bonding to each other for collection, by the presence of the diatomaceous earth in a dried state among the particles of the deacidifier. Accordingly, the diatomaceous earth enhances the deacidifying effect through improvements of dispersion of the deacidifier during the deacidifying operation, but, for achieving the above purpose, it is practical to add 0.5 to 2 parts of diatomaceous earth to 1 part of zeolite. It is to be noted that the deacidifier of this kind is simultaneously provided with the role as a filter aid and that as a deacidifier.

DETAILED DESCRIPTION OF PREFERRED EMBODIMENT

Hereinbelow, EXAMPLES of the adsorbing deacidifier according to the present invention will be inserted for the purpose of illustrating the present invention, without any intention of limiting the scope thereof.

(EXAMPLE 1)

33.6 parts of aqueous solution of NaOH at 25.5% were added to 100 parts of synthetic zeolite A-4 for sufficient mixing. In the above case, the ratio will be 25 parts of water and 8.6 parts of NaOH to 100 parts of zeolite. With respect to the deacidifier, the contents are 18.7% of water and 6.4% of NaOH.

100 g of refined soy bean oil added with soy bean oil mixed fatty acid, to have AV at 0.54 was heated up to 70 degree C, and then, added with 0.72 g (excess at 20% with respect to the neutralization equivalent amount) of this deacidifier, and, after 10 minutes' stirring and mixing, subjected to suction filtering with the use of Toyo filtering paper No. 2.

The state of dispersion of the deacidifier during the deacidifying operation was favorable, with a large filtering speed, and the deacidified oil was pure and clear. The AV of the deacidified oil was 0.06, and the deacidifying efficiency was about 89%. Meanwhile, PH at the water layer (referred to as rinsed water hereinbelow) after addition of 30 g of water to 50 g of deacidified oil subsequent stirring and mixing of the mixture for 10 minutes at temperatures of 50 to 60 degree C., was 6.25, without presence of alkaline component noticeable.

(EXAMPLE 2)

25.2 parts of NaOH aqueous solution at 20.6% are added to 100 parts of natural zeolite for sufficient mixing. The said natural zeolite is heated to dry at the temperature of 150 degree C., 5 hours before use. The above mentioned natural zeolite called SAN ZEOLITE 3S is produced by SAN ZEOLITE INDUSTRY CO., LTD., at Futatsui, Akita Prefecture, Japan, which is burnt product in powder form at 300 meshes, burnt at the temperature of 350 - 400 degree C., by heated air for about 8 minutes. In the above case, the ratio is at 20 parts of water and 5.2 parts of NaOH with respect to 100 parts of zeolite. With respect to the deacidifier, the contents are 16.0% of water and 4.2% of NaOH.

100 g of refined soy bean oil having AV of 0.54 through addition thereto of soy bean oil mixed fatty acid was heated up to 70 C., and, after addition thereto of 1.11 g of this deacidifier (excess at 20% with respect to the neutralization equivalent amount) and subsequent stirring and mixing thereof for 10 minutes, was subjected to suction filtering with the use of Toyo filtering paper No. 2. Although the dispersion of the deacidifier during the deacidifying operation was rather poor, the filtering speed was large, and the resultant deacidified oil was purely clear. The AV of the deacidified oil was 0.12, with the deacidifying efficiency of about 78%. The PH of the rinsed water of the the deacidified oil was 6.10, without any sign of presence of alkaline component.

(EXAMPLE 3)

Natural zeolite (produced in Kansas City U.S.A., name used in trade "ZBS-15") was heated for drying at 150 degree C. for 5 hours, and then, crushed into 300 meshes. To 100 parts of zeolite thus treated into 300 meshes. To 100 parts of zeolite thus treated, 33.6 parts of NaOH aqueous solution at 25.5% was added for sufficient mixing, with addition thereto of 100 parts of diatomaceous earth (produced in California, U.S.A., name used in trade "Celite") for further sufficient mixing. In this case, the ratio is at 25 parts of water and 8.3 parts of NaOH with respect to 100 parts of zeolite. With respect to the deacidifier, the contents will be 10.7% of water and 3.6% of NaOH, but, since "Celite" is weak in the moisture adsorbing property, water and NaOH are considered to be present as they are adsorbed and fixed in zeolite. "Celite" as referred to above, is present among particles of zeolite and has effects for preventing adhesion and bonding among the zeolite particles themselves so as to assist in dispersion of deacidifiers during deacidifying operation.

100 g of refined soy bean oil adjusted to have AV at 0.54 through addition of soy bean oil mixed fatty acid, was heated up to a temperature of 70 degree C., with subsequent addition thereto of 1.26 g (excess at 20% with respect to the neutralization equivalent amount) of this deacidifier and after stirring and mixing for 10 minutes, was subjected to suction filtering with the use of Toyo filtering paper No. 2.

During deacidifying operation, the state of dispersion of the deacidifier was favorable, with a large filtering speed, and the deacidified oil was purely clean. The AV of the deacidified oil was 0.08, with a deacidifying efficiency at about 85%. The PH of the rinsed water of the deacidified oil was 6.15, and presence of alkaline component was not noticed.

What is claimed is:

1. An adsorbing deacidifier for use in oily substances, comprising natural or synthetic zeolites in powder form and an aqueous solution of sodium hydroxide or potassium hydroxide adsorbed and fixed in said zeolites; wherein said adsorbing deacidifier has a ratio of water ranging from 10 to 40 weight percent.

2. The adsorbing deacidifier of claim 1, wherein said ratio of water in said deacidifier is from 15 to 25 weight percent.

3. An adsorbing deacidifier for use in oily substances, comprising natural or synthetic zeolites in powder form and an aqueous solution of sodium hydroxide or potassium hydroxide adsorbed and fixed in said zeolites; wherein said adsorbing deacidifier has water in a ratio of 10 to 40 weight percent in said deacidifier thus prepared; and wherein further is added diatomaceous earth at any desired ratio.

* * * * *

UNITED STATES PATENT AND TRADEMARK OFFICE
CERTIFICATE OF CORRECTION

PATENT NO. : 4,499,196
DATED : February 12, 1985
INVENTOR(S) : Etsuji YUKI

It is certified that error appears in the above—identified patent and that said Letters Patent is hereby corrected as shown below:

In the Abstract, lines 1,2,8, 10,11 and 12, "diacidifier" is to be changed to -- deacidifier---.

line 8, "diacidification", is to be changed to --- deacidification ---.

Column 3, line 4, "poor" is to be changed to -- pore--.

Column 3, lines 46,47, after the words "the mark", each occurence, in sequence, insert , the marks ● ;  ▲ ; and ■ .

Signed and Sealed this

Twentieth Day of August 1985

[SEAL]

Attest:

DONALD J. QUIGG

Attesting Officer          Acting Commissioner of Patents and Trademarks